(12) United States Patent
Frederick et al.

(10) Patent No.: US 11,002,831 B2
(45) Date of Patent: May 11, 2021

(54) ACTIVE ROAD DEBRIS BLOCKING DEVICES AND ROAD DEBRIS BLOCKING SYSTEMS FOR VEHICLES

(71) Applicant: Toyota Motor Engineering & Manufacturing North America, Inc., Plano, TX (US)

(72) Inventors: Scott L. Frederick, Brighton, MI (US); Paxton S. Williams, Milan, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 280 days.

(21) Appl. No.: 16/146,022

(22) Filed: Sep. 28, 2018

(65) Prior Publication Data

US 2020/0103503 A1 Apr. 2, 2020

(51) Int. Cl.
*G01S 7/00* (2006.01)
*G01S 7/481* (2006.01)
*B60W 10/30* (2006.01)
G01S 13/931 (2020.01)
G01S 13/86 (2006.01)
B60W 40/06 (2012.01)
B60R 19/48 (2006.01)
G01S 7/40 (2006.01)
G01S 17/931 (2020.01)

(52) U.S. Cl.
CPC .......... *G01S 7/4813* (2013.01); *B60W 10/30* (2013.01); *B60R 19/483* (2013.01); *B60W 40/06* (2013.01); *G01S 13/867* (2013.01); *G01S 13/931* (2013.01); *G01S 17/931* (2020.01); *G01S 2007/4039* (2013.01); *G01S 2013/9322* (2020.01); *G01S 2013/93274* (2020.01)

(58) Field of Classification Search
CPC ..... G01S 7/4813; B60W 10/30; B60W 40/06; B60R 19/483; B60R 21/013; B60R 2021/01304
USPC ........................................................ 250/239
See application file for complete search history.

(56) References Cited

U.S. PATENT DOCUMENTS 7,166,819 B2  1/2007  Winter et al.
8,368,587 B2  2/2013  Takeuchi
(Continued)

FOREIGN PATENT DOCUMENTS

CN  107878308 A  4/2018
CN  207181667 U  4/2018
(Continued)

*Primary Examiner* — Kevin K Pyo
(74) *Attorney, Agent, or Firm* — Dinsmore & Shohl LLP

(57) ABSTRACT

A vehicle includes a road debris blocking system that provides a barrier to road debris at a surveying sensor. The vehicle includes a vehicle body and a processor. A road debris blocking device moves between a stowed configuration and a deployed configuration relative to the vehicle body. An actuator moves the road debris blocking device between the stowed configuration and the deployed configuration. A wheel angle sensor provides a signal to the processor indicative of a wheel angle. A memory module is communicatively coupled to the processor that stores logic that, when executed by the processor, causes the system to receive the signal from the wheel angle sensor and instruct the actuator to move the road debris blocking device from the stowed configuration to the deployed configuration based on the signal.

10 Claims, 4 Drawing Sheets

(56) References Cited

U.S. PATENT DOCUMENTS

| | | | |
|---|---|---|---|
| 8,474,920 | B2 | 7/2013 | Alcantara et al. |
| 9,348,014 | B2 | 5/2016 | Lee et al. |
| 9,453,910 | B2 | 9/2016 | Elwart et al. |
| 2006/0176158 | A1* | 8/2006 | Fleming .............. B60R 16/0232 340/425.5 |
| 2017/0313288 | A1* | 11/2017 | Tippy ..................... B60R 11/04 |

FOREIGN PATENT DOCUMENTS

| | | |
|---|---|---|
| DE | 19850639 A1 | 5/1999 |
| DE | 102006038219 A1 | 2/2008 |
| JP | 02191584 A | 7/1990 |

* cited by examiner

ACTIVE ROAD DEBRIS BLOCKING DEVICES AND ROAD DEBRIS BLOCKING SYSTEMS FOR VEHICLES

TECHNICAL FIELD

The present specification generally relates to road debris blocking devices, and more specifically, active road debris blocking devices and associated systems for vehicles.

BACKGROUND

Current vehicles include a number of sensors distributed over their body exteriors in locations that allow them to obtain data. For autonomous vehicles, sensors may be used to obtain data in 360 degrees around the vehicle. Under driving conditions, mud, snow and water may be thrown from tires of the vehicle onto the sensors thereby potentially inhibiting the ability of the sensors to collect data that may be used for decision making by the vehicle.

Accordingly, a need exists for road debris blocking systems that actively deploy road debris blocking devices based on predetermined conditions and actively stow the road debris blocking devices when the predetermined conditions are not present.

SUMMARY

In one embodiment, a vehicle includes a road debris blocking system that provides a barrier to road debris at a surveying sensor. The vehicle includes a vehicle body and a processor. A road debris blocking device moves between a stowed configuration and a deployed configuration relative to the vehicle body. An actuator moves the road debris blocking device between the stowed configuration and the deployed configuration. A wheel angle sensor provides a signal to the processor indicative of a wheel angle. A memory module is communicatively coupled to the processor that stores logic that, when executed by the processor, causes the system to receive the signal from the wheel angle sensor and instruct the actuator to move the road debris blocking device from the stowed configuration to the deployed configuration based on the signal.

In another embodiment, a method of inhibiting road debris from contacting a surveying sensor is provided. The method includes providing a signal indicative of wheel angle from a wheel angle sensor to a processor. The processor instructs an actuator to move a road debris blocking device from a stowed configuration to a deployed configuration relative to a vehicle body based on the signal.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include road debris blocking systems that utilize active road debris blocking devices that, in a deployed configuration, block debris from contacting surveying sensors of the vehicle and, in a stowed configuration, retract into a body of the vehicle such that the road debris blocking devices can blend with styling of the body. The debris blocking systems may include a wheel angle sensor that provides wheel position information, such as steering control information to a controller that can deploy or stow the active road debris devices using an actuator based on the wheel position information. The controller may instruct the actuator to move the active road debris blocking devices from the stowed configuration to the deployed configuration when a wheel angle is at or beyond a predetermined turn angle. At the predetermined wheel angle, the wheel may tend to send debris toward the surveying sensor based, at least in part, on road conditions.

Figure 1:
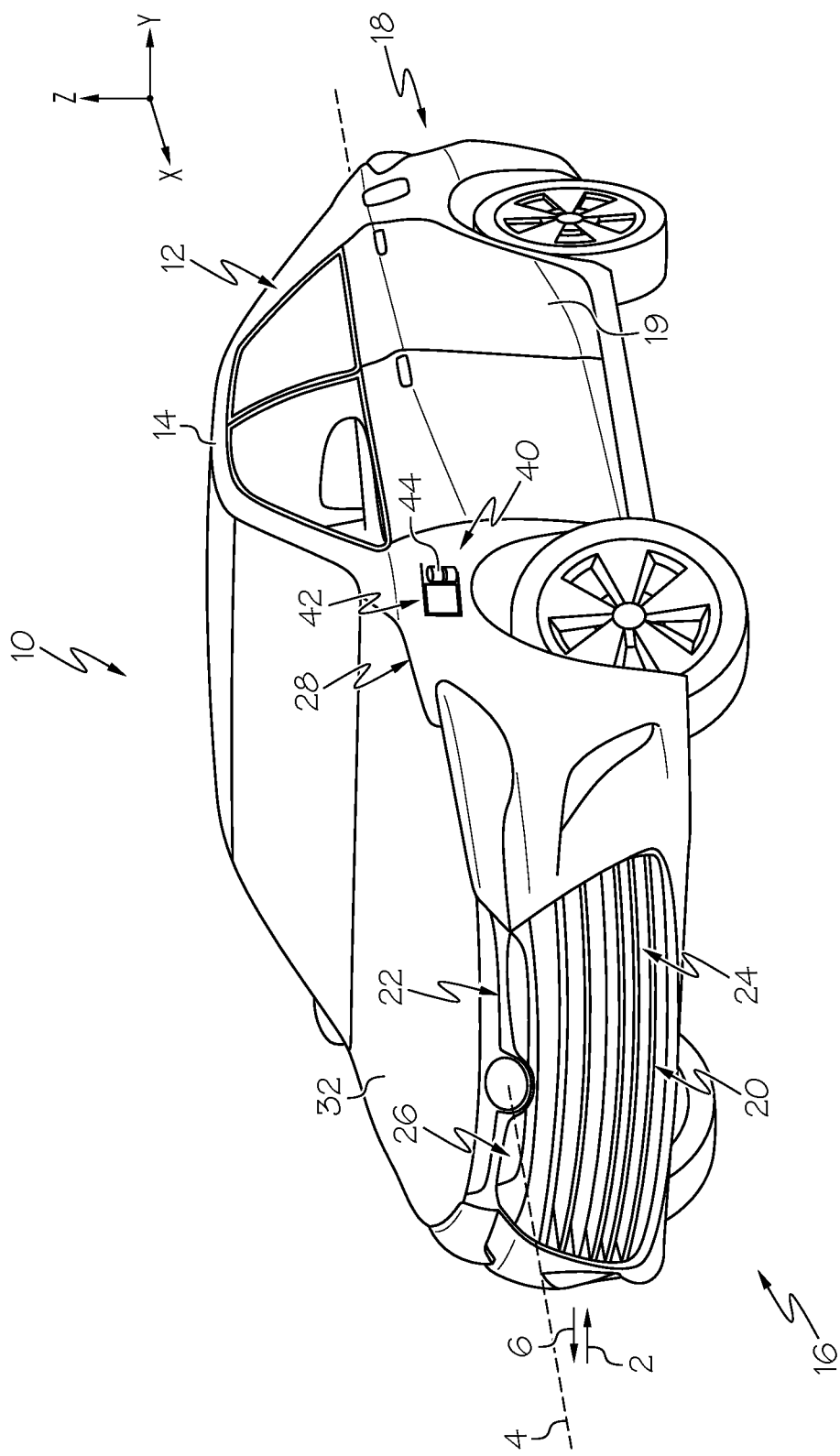
FIG. 1 depicts a perspective view of a vehicle including a road debris blocking system, according to one or more embodiments shown and described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

The vehicle 10 may be autonomous and includes a vehicle body 12 including a body framework 14 and having a front 16, a rear 18 and sides 19 that extend between the front 16 and the rear 18. When referring to autonomous or partially autonomous vehicles, it is meant to refer to vehicles having at least one drive mode wherein a human operator is not necessary to guide the vehicle. In some embodiments, aspects of the present disclosure may apply to various vehicle types, such as planes, trucks, boats, etc. with autonomous, partially autonomous driving systems or not. The vehicle 10 includes a front end assembly 20 at the front 16 of the vehicle body. The front end assembly 20 includes an upper bumper cover portion 22 that extends in a vehicle-lateral direction of the vehicle 10. The front end assembly 20 may further include a lower grille assembly 24 and an upper grille assembly 26 with the upper bumper cover portion 22 disposed therebetween. The vehicle 10 may also include front fenders 28 disposed at opposite sides of the upper grille assembly 26 and the lower grille assembly 24 with headlamp assemblies 30. A hood 32 may be located above the upper grille assembly 26 that provides a cover for an engine compartment.

Motor vehicles that incorporate elements according to the present disclosure may include a variety of construction methodologies that are conventionally known, including a unibody construction methodology as well as a body-on-frame construction methodology. Furthermore, the Figures may only show one side of the vehicle. Descriptions of the other side of the vehicle may be omitted because both sides of the vehicle may be laterally symmetrical and substantially the same.

The vehicle 10 includes a road debris blocking system, generally referred to as element 40, that includes an active road debris blocking device 42 that has both a stowed configuration, as shown, and a deployed configuration. The road debris blocking device 42 provides a barrier between a surveying sensor 44 (e.g., LIDAR, ultrasonic, camera, radar, etc.).

Figure 2:
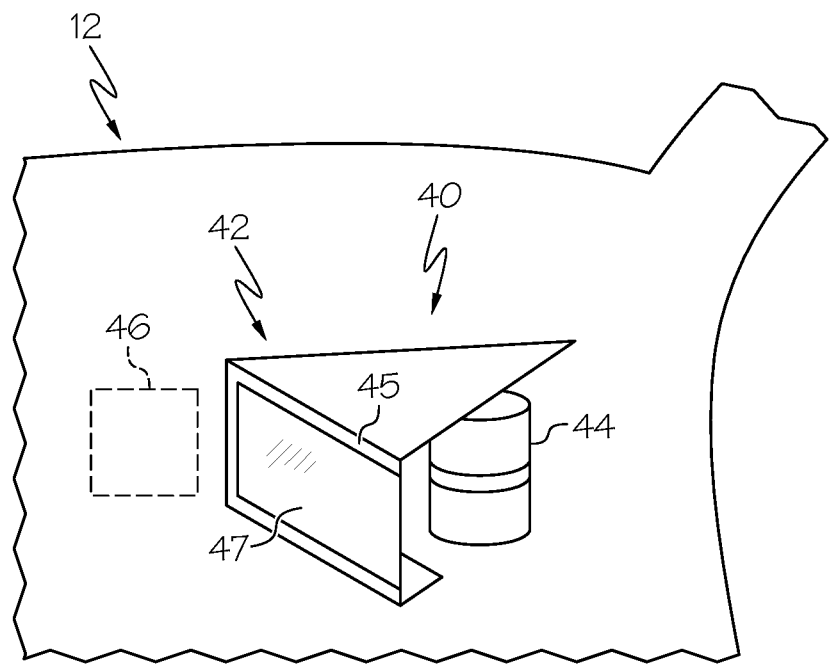
FIG. 2 illustrates an active road debris blocking device of the road debris blocking system of FIG. 1 in a deployed configuration, according to one or more embodiments shown and described herein.

Referring to FIG. 2, the active road debris blocking device 42 is schematically illustrated in greater detail. The active road debris blocking device 42 includes a support frame 45 that supports an anti-reflective panel 47. As used herein "anti-reflective" refers to materials (e.g., glass, plastics, etc.) and coatings that reduce reflectance, such as in the ultraviolet, visible and infrared wavelengths. When light is incident upon the boundary between two media, some of the energy is reflected and some is transmitted. Anti-reflective material control the phase of the reflected energy from enough interfaces that the reflected waves from all interfaces nearly cancel one another out, resulting in low surface reflectance. For example, materials having 90% of light transmission or more may be referred to as anti-reflective.

Figure 3:
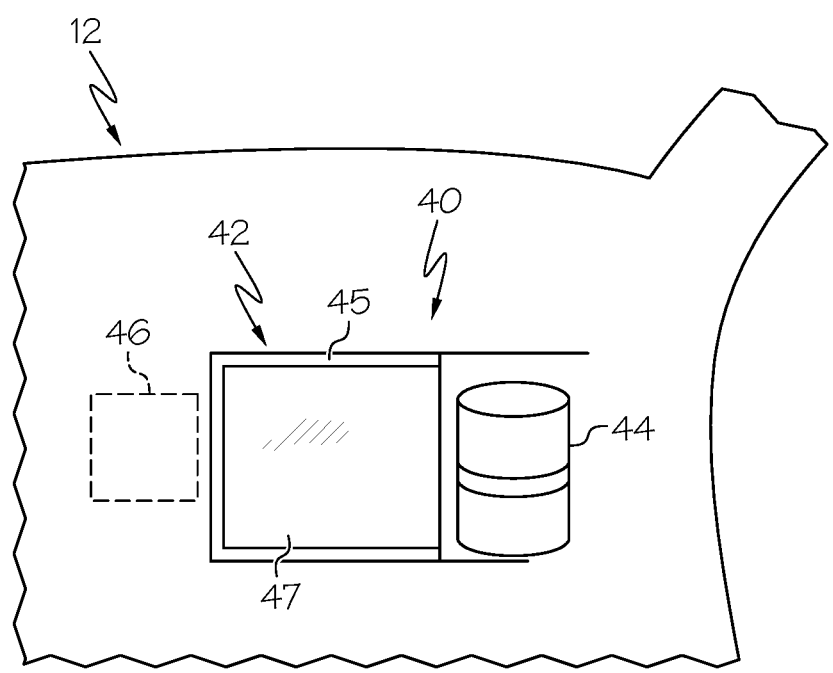
FIG. 3 illustrates the active road debris blocking device of FIG. 2 in a stowed configuration, according to one or more embodiments shown and described herein.

The support frame 44 is connected to an actuator 46 (e.g., a motor) that is used to extend and retract the active road debris blocking device 42 by pivoting the active road debris blocking device about a pivot axis. FIG. 2 illustrates the active road debris blocking device 42 in the deployed configuration. Referring to FIG. 3, the active road debris blocking device 42 can be retracted by the actuator 46 into the vehicle body 12 based upon a predetermined condition indicative of a wheel angle. The vehicle body 12 includes slots 48 and 50 into which the active road debris blocking device 42 can retract, thereby reducing a lateral footprint of the active road debris blocking device 42 outside the vehicle body 12. In the deployed configuration, the active road debris blocking device 42 provides a barrier between a front wheel 50 and the surveying sensor 44, such as LiDAR, radar, etc.

Figure 4:
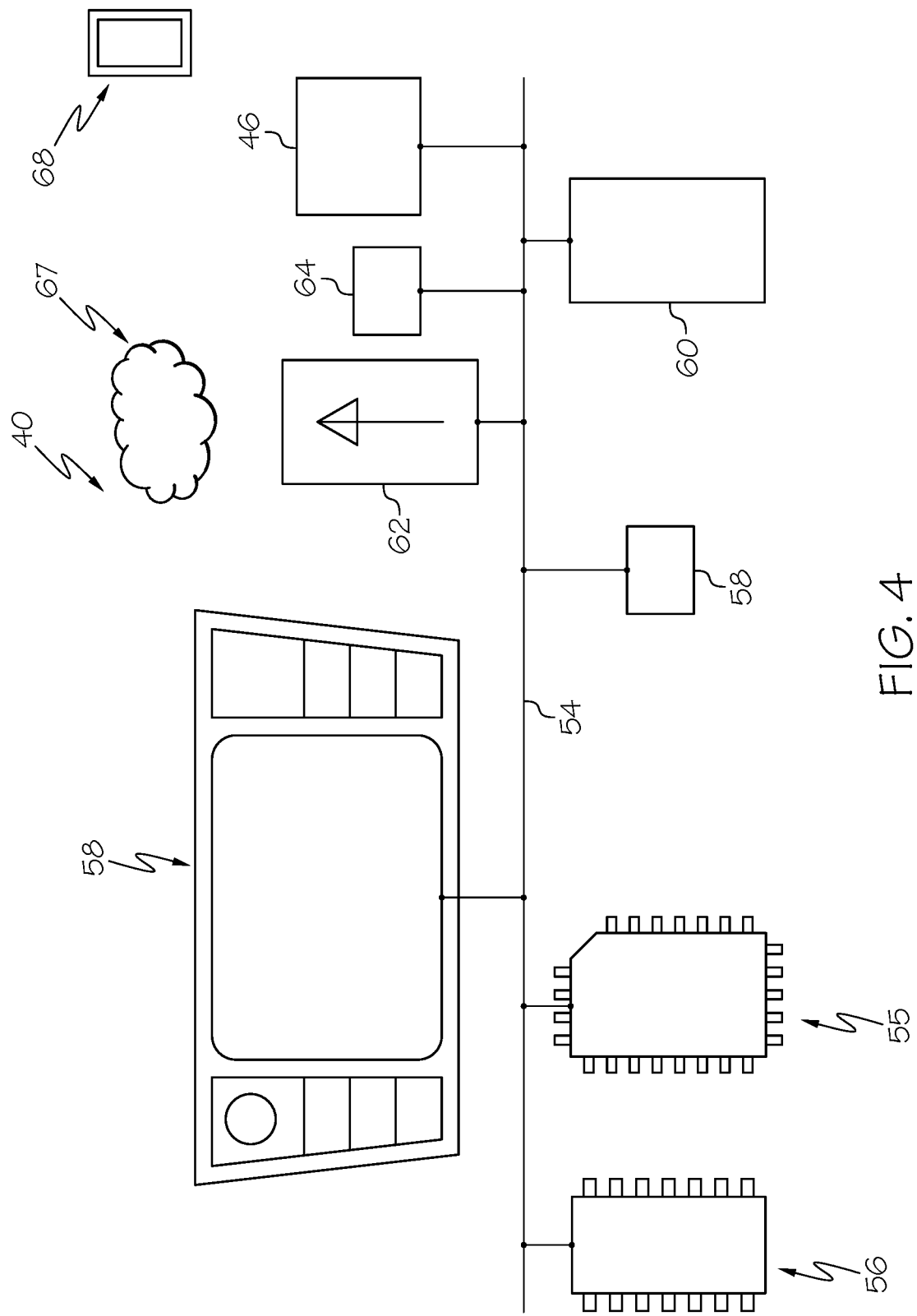
FIG. 4 is a schematic representation of the road debris blocking system of FIG. 1, according to one or more embodiments shown and described herein.

Referring to FIG. 4, the road debris blocking system 40 of the vehicle 10 is illustrated schematically. The road debris blocking system 40 includes a communication path 54, a processor 55, a memory module 56, a light source 58, the actuator 46 and a wheel angle sensor 60. The road debris blocking system 40 may further include a display 58, network interface hardware 62, and a drive mode sensor 64. It is noted that, while the vehicle 10 may be depicted herein as an automobile, the vehicle 10 may be any passenger vehicle such as, for example, a terrestrial, aquatic, and/or airborne vehicle.

The road debris blocking system 40 includes the communication path 54 that provides data interconnectivity between various modules disposed within the road debris blocking system 40. Specifically, each of the modules can operate as a node that may send and/or receive data. In some embodiments, the communication path 54 includes a conductive material that permits the transmission of electrical data signals to processors, memories, sensors, and actuators throughout the road debris blocking system 40. In some embodiments, the communication path 54 can be a bus, such as for example a LIN bus, a CAN bus, a VAN bus, and the like. In further embodiments, the communication path 54 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

The road debris blocking system 40 includes the processor 55 communicatively coupled with the memory module 56 over the communication path 54. The processor 55 may include any device capable of executing machine-readable instructions stored on a non-transitory computer-readable medium. The processor 55 may include one or more processors. Accordingly, each processor 55 may include a controller, an integrated circuit, a microchip, a computer, and/or any other computing device.

The memory module 56 is communicatively coupled to the processor 55 over the communication path 54. The memory module 56 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the road debris blocking system 40 and/or external to the road debris blocking system 40. The memory module 56 may be configured to store one or more pieces of logic. The memory module 56 may include one or more memory modules. The embodiments described herein may utilize a distributed computing arrangement to perform any portion of the logic described herein.

Embodiments of the present disclosure include logic stored on the memory module 56 that includes machine-readable instructions and/or an algorithm written in any programming language of any generation (e.g., 1GL, 2GL, 3GL, 4GL, and/or 5GL) such as, machine language that may be directly executed by the processor 55, assembly language, object-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components.

The road debris blocking system 40 may utilize the light source 58 or other indication device, such as a speaker. The road debris blocking system 40 further includes the actuator 46. The actuator 46 may include one or more actuators that can be used to move the active road debris blocking device 42 to a desired position. The actuator 46 can be coupled to the communication path 54 and communicatively coupled to the processor 55 to control movement and positioning of the active road debris blocking device 42.

Figure 5:
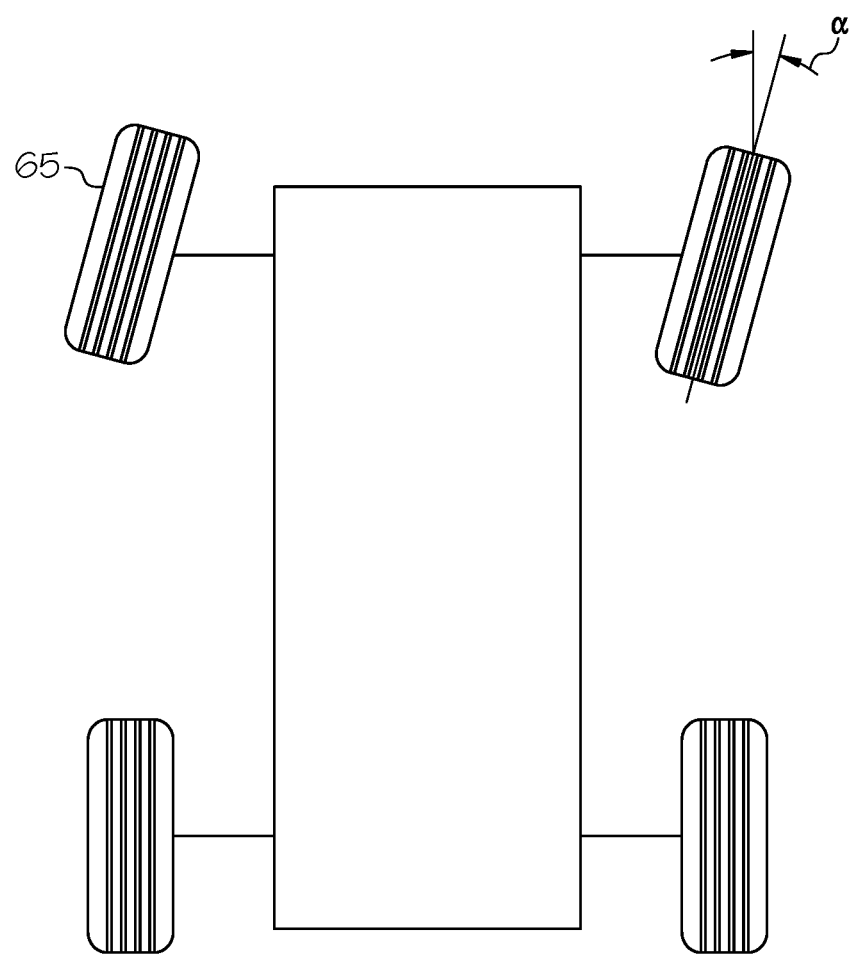
FIG. 5 is a schematic representation of a vehicle having wheel angles for a turn operation, according to one or more embodiments shown and described herein.

Referring also to FIG. 5, the road debris blocking system 40 further includes the wheel angle sensor 60. The wheel angle sensor 60 provides a signal to the processor 55 that is indicative of wheel angle (e.g., relative to the longitudinal direction). For example, the wheel angle sensor 60 may monitor wheel angle directly (e.g., by monitoring tire position) or indirectly (e.g., by monitoring steering wheel position). In some embodiments, the road debris blocking system 40 may deploy the active road debris blocking device 42 when a wheel angle $\alpha$ is at least about 25 degrees or greater, such as about 30 degrees or greater, such as about 35 degrees or greater, such as about 40 degrees or greater, such as about 40 degrees or greater.

In some embodiments, the road debris blocking system 40 further includes network interface hardware 62 for communicatively coupling the road debris blocking system 40 with a network 67. The network interface hardware 62 can be communicatively coupled to the communication path 54 and can be any device capable of transmitting and/or receiving data via the network 67. Accordingly, the network interface hardware 62 can include a communication transceiver for sending and/or receiving any wired or wireless communication. For example, the network interface hardware 62 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 62 includes hardware configured to operate in accordance with the Bluetooth wireless communication protocol. In another embodiment, network interface hardware 62 may include a Bluetooth send/receive module for sending and receiving Bluetooth communications to/from a mobile device 68.

The road debris blocking system 40 may communicate, through the network interface hardware 62, with the network 67 to communicatively couple the road debris blocking system 40 with the mobile device 68. In one embodiment, the network 67 is a personal area network that utilizes Bluetooth technology to communicatively couple the road debris blocking system 40 and the mobile device 68. In other embodiments, the network 67 may include one or more computer networks (e.g., a personal area network, a local area network, or a wide area network), cellular networks, satellite networks and/or a global positioning system and combinations thereof. Accordingly, the road debris blocking system 40 can be communicatively coupled to the network 67 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

In some embodiments, the mobile device 68 may be included as a user input device. The mobile device 60 may include a processor and a memory module. The processor 55 can execute logic to communicate with the road debris blocking system 40 in order to facilitate sending instructions to the road debris blocking system 40 from the mobile device 68 to adjust a position of the active road debris blocking device 42. The mobile device 68 may be configured with wired and/or wireless communication functionality for communicating with the road debris blocking system 40. In embodiments described herein, the mobile device 68 may include mobile phones, smartphones, personal digital assistants, dedicated mobile media players, mobile personal computers, laptop computers, and/or any other mobile devices capable of being communicatively coupled with the road debris blocking system 40. It is noted, that in this embodiment, the road debris blocking system 40 may communicate with the mobile device 68 even while the mobile device 68 is outside of a cabin of the vehicle 10. In this way, the active road debris blocking device 42 may be adjusted with the mobile device 68 from outside of the vehicle 10.

The road debris blocking system 40 may further include the display 58 for providing visual output such as, for example, maps, navigation, entertainment, information, image data from a camera, or a combination thereof. The display 58 may be, for example, part of an infotainment system of the vehicle 10. In some embodiments, the display 58 provides a visual indication of position of the active road debris blocking device 42. The display 58 is coupled to the communication path 54. Accordingly, the communication path 54 communicatively couples the display 58 to other modules of the road debris blocking system 40. The display 58 may include any medium capable of transmitting an optical output such as, for example, a cathode ray tube, light emitting diodes, a liquid crystal display, a plasma display, or the like. Moreover, the display 58 may be a touchscreen that, in addition to providing optical information, detects the presence and location of a tactile input upon a surface of or adjacent to the display 58. Accordingly, the display 58 may receive mechanical input directly upon the optical output provided by the display 58. As such, the display 58 may be included as a user input device. Additionally, it is noted that the display 58 can include a processor and a memory module.

The road debris blocking system 40 may further include a drive mode sensor 68 communicatively coupled over the communication path 54 to other vehicle modules. The drive mode sensor 68 may be configured to detect a particular driving mode of the vehicle 10. For example, the drive mode sensor 90 may detect whether the vehicle 10 has been placed in a park driving mode (e.g., park) and output a driving mode signal regarding the same. In one embodiment, the drive mode sensor 68 may be communicatively coupled with a gear shifter of the vehicle 10 and may output a driving mode signal indicative of the gear in which the vehicle 10 has been placed. The road debris blocking system 40, based on the driving mode of the vehicle 10, may execute logic to automatically return the active road debris blocking device 42 from the deployed configuration to the stowed configuration or to allow/disallow use of the li road debris blocking system 40. For example, the road debris blocking system 40 may only allow operation of the active road debris blocking device with the vehicle 10 in drive.

The above-described road debris blocking systems include an active road debris blocking device that is used to provide a barrier between a wheel of the vehicle and a surveying sensor, such as a LiDAR. The active road debris blocking device has an anti-reflective panel that can be used to minimize interference and even enhance operation with the surveying sensor when in a deployed configuration. When in a stowed configuration, the active road debris blocking device is retracted into the vehicle body to reduce a footprint of the active road debris blocking device outside the vehicle body.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle including a road debris blocking system that provides a barrier to road debris at a surveying sensor, the vehicle comprising:
   a vehicle body;
   a processor;
   a road debris blocking device that moves between a stowed configuration and a deployed configuration relative to the vehicle body; and
   an actuator that moves the road debris blocking device between the stowed configuration and the deployed configuration;
   wherein the road debris blocking device comprises a frame and an anti-reflective panel that is carried by the frame;
   a wheel angle sensor that provides a signal to the processor indicative of a wheel angle; and
   a memory module communicatively coupled to the processor that stores logic that, when executed by the processor, causes the system to:
   receive the signal from the wheel angel sensor; and
   instruct the actuator to move the road debris blocking device from the stowed configuration to the deployed configuration based on the signal.

2. The vehicle of claim 1, wherein the road debris blocking device retracts into the vehicle body with the road debris blocking device in the stowed configuration.

3. The vehicle of claim 1, wherein the panel provides a barrier between a surveying sensor and a wheel of the vehicle.

4. The vehicle of claim 3, wherein the surveying sensor is one of a radar, LiDAR and ultrasonic sensor.

5. The vehicle of claim 1, wherein the vehicle is autonomous.

6. A method of inhibiting road debris from contacting a surveying sensor of a vehicle, the method comprising:
   providing a signal indicative of wheel angle from a wheel angle sensor to a processor; and
   the processor instructing an actuator to move a road debris blocking device from a stowed configuration to a deployed configuration relative to a vehicle body based on the signal;
   wherein the road debris blocking device comprises a frame and an anti-reflective panel that is carried by the frame.

7. The method of claim 6, wherein the road debris blocking device retracts into the vehicle body with the road debris blocking device in the stowed configuration.

8. The method of claim 6, wherein the panel provides a barrier between a surveying sensor and a wheel of the vehicle.

9. The method of claim 8, wherein the surveying sensor is one of a radar, LiDAR and ultrasonic sensor.

10. The method of claim 6, wherein the vehicle is autonomous.

* * * * *